(12) United States Patent
Veselic (10) Patent No.: US 7,383,452 B2
(45) Date of Patent: Jun. 3, 2008

(54) ELECTRONIC DEVICE AND METHOD FOR INITIATING POWERING-UP OF A PROCESSOR IN THE ELECTRONIC DEVICE

(75) Inventor: Dusan Veselic, Oakville (CA)

(73) Assignee: Research in Motion Limited, Waterloo, Ontario (CA)

(\*) Notice: Subject to any disclaimer, the term of this patent is extended or adjusted under 35 U.S.C. 154(b) by 439 days.

(21) Appl. No.: 11/100,591

(22) Filed: Apr. 7, 2005

(65) Prior Publication Data

US 2006/0230293 A1    Oct. 12, 2006

(51) Int. Cl.
    *G06F 1/26*    (2006.01)
(52) U.S. Cl. ............... 713/300; 713/323; 713/330; 710/8; 710/15; 710/62; 710/72; 710/313; 714/5; 714/22; 714/14; 714/44; 703/18
(58) Field of Classification Search ............... 713/300
    See application file for complete search history.

(56) References Cited

U.S. PATENT DOCUMENTS

| | | | |
|---|---|---|---|
| 6,118,254 A * | 9/2000 | Faulk | 320/141 |
| 6,300,744 B1 * | 10/2001 | Shum | 320/137 |
| 6,938,108 B2 * | 8/2005 | Ohie et al. | 710/63 |
| 7,010,640 B2 * | 3/2006 | Hoshino et al. | 710/313 |
| 7,024,567 B2 * | 4/2006 | Kim et al. | 713/300 |
| 7,082,545 B2 * | 7/2006 | Kubo et al. | 713/330 |
| 2002/0057134 A1 | 5/2002 | Kondo | |
| 2005/0078106 A1 * | 4/2005 | Greenwood et al. | 345/211 |
| 2006/0095641 A1 * | 5/2006 | Pandit et al. | 710/313 |
| 2006/0125446 A1 * | 6/2006 | Tupman et al. | 320/132 |

FOREIGN PATENT DOCUMENTS

WO    WO 2004/075371    9/2004

OTHER PUBLICATIONS

European Search Report. Application No. 05102718.3 2212 Date: Aug. 9, 2005.
Intel, "Using Dialog Semiconductor DA903x Advanced Power Management Controllers with the Intel PXA27x Processor Family", Intel Corporation 2004 pp. 1-13.
Intel. "Intel PXA27x Processor Reference Platform", Intel Corporation 2004 pp. 1-98.
Texas Instruments, "Low Quiescent Current, Programmable-Delay Supervisory Circuit", Texas Intruments Incorporated 2004 pp. 1-8.
Universal Serial Bus Specification Revision 2.0, Apr. 27, 2000, pp. 149-151.

\* cited by examiner

*Primary Examiner*—Nitin C. Patel
(74) *Attorney, Agent, or Firm*—Bereskin & Parr (57) ABSTRACT

A device and method for making a peripheral device compliant with a power management standard, such as the USB standard, are described. The device includes a power management unit (PMU) and a timing unit. The PMU is coupled to a battery pack and to a processor of the peripheral device, and manages power allocated to the processor. The timing unit sends electrical signals to the input terminals of the PMU when the battery pack is connected to the peripheral device. The electrical signals activate the processor via the PMU. The timing unit sends the electrical signals before a configurable time from the time when the battery pack is connected to the peripheral device.

26 Claims, 10 Drawing Sheets

ELECTRONIC DEVICE AND METHOD FOR INITIATING POWERING-UP OF A PROCESSOR IN THE ELECTRONIC DEVICE

FIELD OF THE INVENTION

This invention relates to electronic peripheral devices, and more specifically to powering such devices.

BACKGROUND OF THE INVENTION

Peripheral devices, such as personal data assistants (PDAs), cell phones and printers, may be powered by internal means, typically by a connection to an internal battery pack, or by external means, such as by a connection to an AC power outlet or a host computer. Some peripheral devices can be powered by both internal and external means. For example, a PDA can be connected to a computer to draw power therefrom. Additionally, the PDA can have its own battery pack as a power supply. If the battery pack needs charging, the PDA can be connected to the computer for this purpose.

A convenient method to power a PDA in a mobile setting involves the use of a laptop computer. If the PDA is running low on batteries in the field, the PDA can be connected to a battery-operated laptop computer for powering. If an AC outlet is available, the computer can be plugged into the outlet and the PDA can be connected to the computer to power the PDA.

To make such a connection between a computer and a peripheral device, appropriate software, known as a device driver, is installed in both the computer and peripheral device to establish and manage the connection. Device drivers can be categorized according to the communication standard to which they adhere. One category of device drivers adheres to the standard known as Universal Serial Bus (USB). Device drivers that are USB compliant are convenient because many personal computers come with a plurality of USB ports.

Another convenient USB feature is that the standard allows for the distribution of electrical power to many peripheral devices. The USB standard allows the PC to automatically sense and deliver the required power to the various devices attached thereto.

In addition, USB "hot-swapping" obviates the need to shut down and restart the PC to attach or remove a peripheral device: the PC automatically detects the peripheral device and configures the necessary software. This feature is especially useful for users of multi-player games, as well laptop PC users who want to share peripheral devices.

Because of these and other advantages, devices and methods that ensure that a peripheral device is USB compliant without adversely interfering with the intended operation of the device are desirable.

SUMMARY OF THE INVENTION

Described herein is a device and method for making a peripheral device compliant with a power management standard, such as the USB standard. The device includes a power management unit (PMU) for managing power allocated to a processor of the peripheral device. The PMU has input terminals for electrical coupling to a battery pack that provides power to the peripheral device, and processor communication terminals for electrical coupling to the processor. The device further includes a timing unit for sending electrical signals to the input terminals of the PMU in response to the battery pack being connected to the peripheral device. The electrical signals initiate power-up of the processor via the processor communication terminals. The timing unit is adapted to send the electrical signals after a configurable time t1 but early enough to ensure power-up is completed in a configurable time t2 that is less than a power management standard time. In one embodiment, the power management standard time is that of the universal serial bus (USB) standard, viz., 100 ms. In addition, the device allows the processor to power up after the peripheral device is connected to a USB enabled host device. The device also provides forced reset and suspend functionality that is USB compliant.

BRIEF DESCRIPTION OF THE DRAWINGS

For a better understanding of the present invention and to show more clearly how it may be carried into effect, reference will now be made, by way of example, to the accompanying drawings, in which.

DETAILED DESCRIPTION OF THE INVENTION

Figure 1:
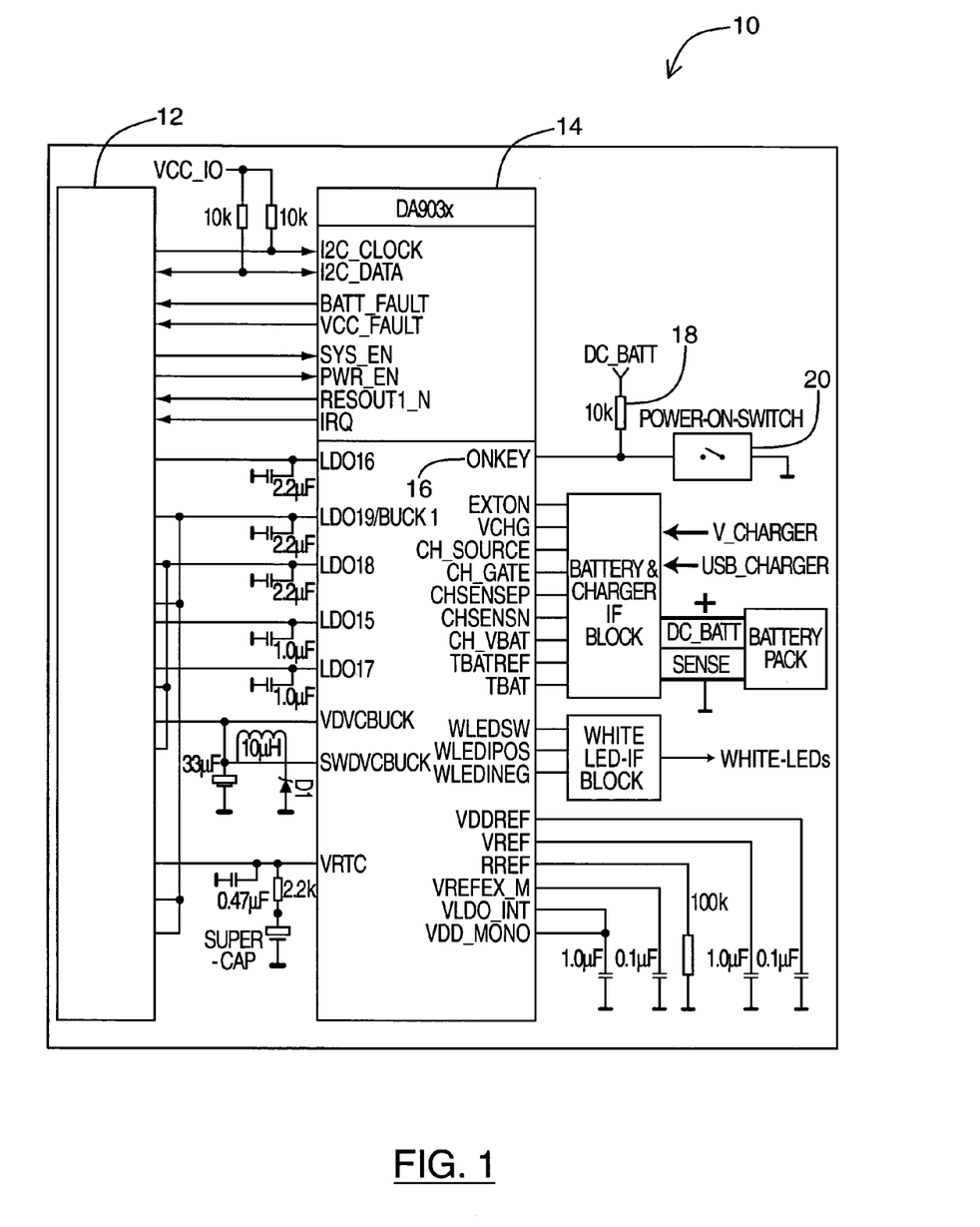
FIG. 1 shows a conventional device for powering a processor of a handheld device.

FIG. 1 shows a conventional device 10 for powering a processor 12 of a handheld device (not shown). The device 10 includes a power management unit (PMU) 14 coupled to the processor 12. The PMU 14 has an input ONKEY "pin" or terminal 16 coupled to a battery pack 18. The device 10 also includes a power switch 20.

When a user of the handheld device inserts the battery pack 18 into the handheld device, the insertion alone does not cause the processor 12 to power up. Instead, after inserting the batteries, the ONKEY terminal 16 assumes a particular positive voltage V+, which depends on the voltage of the battery pack 18. If the user then closes the power switch 20 by depressing the "On" button (not shown) on the handheld device, the ONKEY terminal 16 assumes a zero voltage. The change from V+ to 0 volts activates the ONKEY terminal 16 of the PMU 14, which then starts a sequence of events leading to powering up of the processor 12.

However simple this method of powering up the processor 12 may be, the method suffers from one significant drawback: it is not USB compliant. In particular, the USB standard dictates that upon insertion of the battery pack, the processor must power up within 100 ms, during the enumeration period. Relying on human intervention to press the "On" button, within 100 ms of battery insertion, is not practical. A device and method that addresses this shortcoming is now described.

Figure 2:
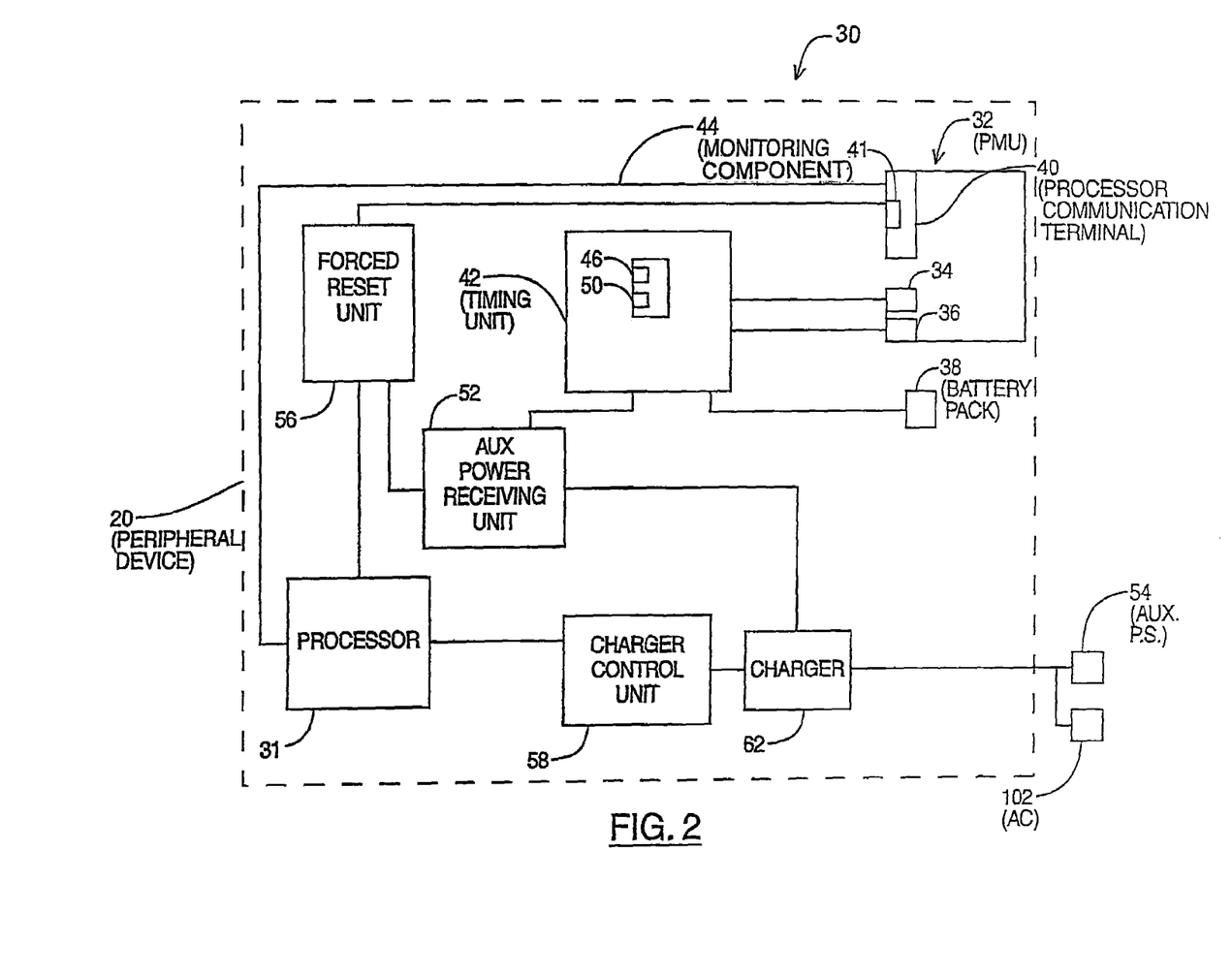
FIG. 2 is a block diagram of a device for making a peripheral device compliant with a USB standard for power management, in accordance with the principles of the present invention.

Referring to FIG. 2, a block diagram of a device 30 for making a peripheral device 20 compliant with the USB power management standard is shown. As used herein, the term "peripheral device" can include any device that can derive power from a connection to a host computer, such as a personal digital assistant (PDA), a telephone, a digital camera, a modem, a keyboard, a mouse, a joystick, a CD-ROM drive, a tape drive, a floppy drive, a digital scanner, a printer, a data glove or a digitizer.

The device 30 includes a power management unit (PMU) 32, such as a Dialog™ DA9030 PMU, having an ONKEY input terminal 34 and an EXTON input terminal 36 electrically coupled to a battery pack 38, and processor communication terminals 40, such as a real time clock (RTC) terminal 41, electrically coupled to a processor 31, such as an Intel™ PXA27x processor, of the peripheral device 20. The device 30 also includes a timing unit 42 having a monitoring component 44 with a reset (RST) terminal 46 and a master reset (MR) terminal 50.

The device 30 also includes an auxiliary power receiving unit 52 coupled, via a charger 62, to an auxiliary power supply 54 or an AC power supply 102. The auxiliary power supply 54 can include, for example, a laptop computer capable of providing power to the device 30.

The device 30 further includes a forced reset unit 56 and a charger control unit 58 coupled to a charger 62. The forced reset unit 56 is in electrical communication with the processor 31 and one processor communication terminal 40 of the PMU 32, viz. a real time clock (RTC) terminal 41.

The input terminals 34 and 36 of the PMU are electrically coupled to the battery pack 38 via the timing unit 42 for providing power to the peripheral device 20. When the battery pack 38 is connected to the peripheral device 20, the timing unit 42 sends electrical signals to at least one of the input terminals 34 and 36 of the PMU 32. These electrical signals initiate a power-up sequence of the processor 31 (or more concisely, initiate power-up of the processor) via the processor communication terminals 40. After a time t2, measured from the insertion of the battery pack 38, the peripheral device 20, or more specifically, the processor 31 thereof, completes the power-up sequence. The end of the power-up sequence occurs when an end-of-reset signal is sent to the processor 31, which signals the start of when the processor 31 can begin executing code.

After a time t1 from the time when the battery pack is connected to the peripheral device 20, the timing unit 42 is adapted to send to the processor 31 the electrical signals that initiate the power-up sequence. In addition, the timing unit 42 is configured to send the electrical signals early enough to ensure that before a time t2>t1 from the time when the battery pack is connected to the peripheral device 20, the power-up sequence of the processor 31 is completed. The times t1 and t2 are configurable to meet operating specifications.

In particular, the time t1 can be chosen to be compatible with the operating specifications of the PMU 32. For example, one PMU that can be used is the Dialog™ DA9030 having pins or terminals to which voltages can be applied for various power management functions. This PMU 32 requires at least 32 ms to elapse between a first voltage transition (e.g. low to high) at a terminal and a second voltage transition (high to low) at the same terminal if the second transition is to register.

The time t2, on the other hand, can be chosen to conform to a universal serial bus (USB) standard, or any other standard. For example, the USB standard dictates that within 100 ms of inserting the battery pack, the peripheral device 20 must complete the power up sequence. Thus, in one embodiment that is USB compliant, t2 is less than 100 ms.

Applying a positive-edge (i.e., low to high) voltage triggering signal at the EXTON terminal 36 of the PMU 32 initiates a sequence of events that activate the processor 31. Thus, applying the triggering signal at the EXTON terminal 36 initiates the power-up of the processor 31. In particular, the PMU 32 includes at least one PMU component 33, such as an internal reference, an internal oscillator, a voltage surpervisor, a buck converter and an LDO regulator. These PMU components 33 are electrically coupled to corresponding components (not shown in FIG. 2) in the processor 31. When a positive-edge triggering signal is applied to the EXTON terminal 36, these PMU components 33, and the corresponding components in the processor 31 start up, resulting in the activation of the processor 31.

The RST terminal 46, which can be used for resetting the peripheral device 20, is electrically coupled to the EXTON terminal 36 and can also be used to power on the peripheral device 20 after battery pack insertion. The monitoring component 44 is configured so that a) after the battery is connected to the peripheral device 20, the RST terminal 46 assumes a low voltage, and b) after the time t1, but before t2, the RST assumes a high voltage. Because the RST terminal 46 is connected to the EXTON terminal 36, the voltage on the EXTON terminal 36 also assumes a low voltage upon battery insertion, and then assumes a high voltage a time t1 later. Choosing t1=32 ms ensures that the PMU 32 can register the latter voltage transition and thereby power up the processor 31.

The auxiliary power receiving unit 52 receives an auxiliary voltage from the auxiliary power supply 54 via the charger 62 for providing power to the peripheral device 20. The auxiliary power receiving unit 52 sends an auxiliary power signal to the timing unit 42 for activating the processor 31 in response to receiving the auxiliary voltage.

The timing unit 42 is adapted for sending electrical signals to the input terminals of the PMU 32 for powering up the processor 31 with an auxiliary power supply. These electrical signals are sent before a time t3 from the time when the auxiliary power supply 54 is connected to the peripheral device 20. The USB standard dictates that the processor power up within 100 ms of connecting the auxiliary power supply 54, during the enumeration period. For example, the auxiliary power supply 54 can be a host device, such as a laptop computer, having a USB port to which the peripheral device 20 can be connected. During the enumeration period that follows this connection, the peripheral device 20 identifies itself to the host device and negotiates power distribution. During this enumeration period and within 100 ms of connecting to the auxiliary power supply 54, the peripheral device 20 must power up to be USB compliant. Thus, if t3=100 ms, this USB requirement is met.

Before the peripheral device 20 is connected to the auxiliary power supply 54, the peripheral device 20 may already be connected to the battery pack, and may be in an inactive state if the battery pack is in a low voltage state or dead. With insertion of the auxiliary power supply 54, the peripheral device 20 powers up within a time t3.

The forced reset unit 56 serves to reset the processor 31 by first powering down the peripheral device 20 and then powering up the peripheral device 20 in response to receiving a forced reset signal from the processor 31. The forced reset unit 56 includes a transistor (not shown in FIG. 2) for sending a signal to the timing unit 42 for powering down the peripheral device 20. The RTC terminal 41 is coupled to the processor 31 via the forced reset unit 56, such that the forced reset signal saturates the gate of the transistor, thereby lowering a voltage on the RTC terminal 41 and powering down the peripheral device 20. The forced reset signal causes the voltage on the MR terminal 50 to be asserted, thereby powering up the peripheral device 20.

The charger control unit 58 is coupled to a charger 62 for controlling power delivered to the processor 31 from an auxiliary power supply 54, such as a battery pack 38, a host device or an AC power supply. The charger 62 has a charge enable (CE_bqll) terminal 106, which when asserted by the processor 31, activates the charger 62. The charger control unit 58 includes a capacitor (not shown in FIG. 2) for holding enough charge, during a period t4 after the charge-on terminal is de-asserted, to power up the processor 31. After the processor 31 powers down and the voltage on the charge-on terminal is de-asserted, the charge held in the capacitor permits the processor to power up in a time less than t4. In one embodiment, t4 is on the order of 100 ms.

When the processor 31 issues a suspend command to the charger 62, the charger inactivates in a time t5 less than t4. In one embodiment, t5 is about 10 ms.

Figure 3:
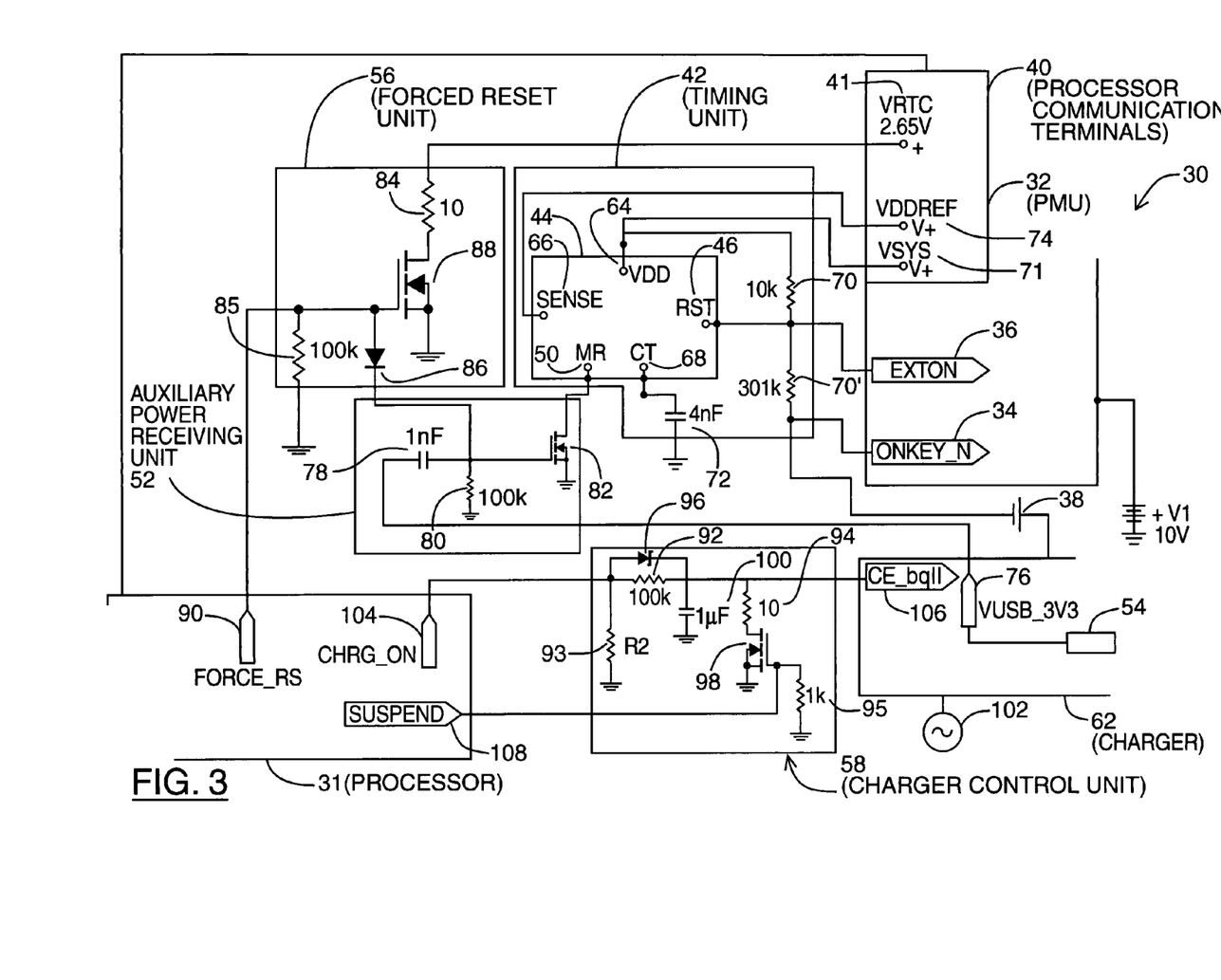
FIG. 3 is a circuit diagram of the device of FIG. 2.
Figure 7:
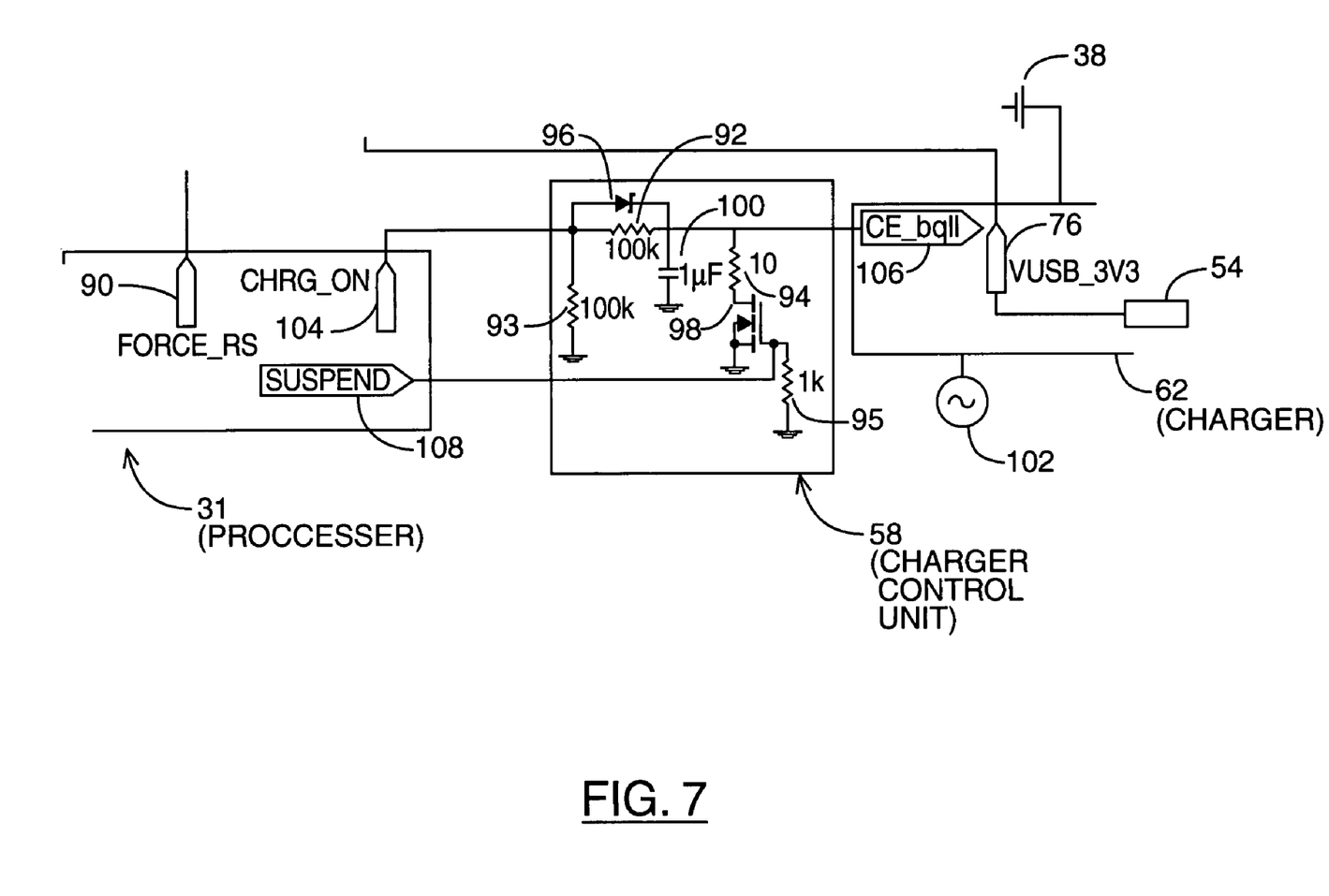
FIG. 7 is a circuit diagram of the charger control unit of FIG. 2.

Referring to FIG. 3, a circuit diagram of the device 30 of FIG. 2 for powering up a processor is shown. The circuit diagram of FIG. 7 shows the interconnections of the various units comprising the device 30. In operation, after the battery pack 38 is connected to the peripheral device 20 (not shown in FIG. 3), the RST terminal 46 assumes a low voltage. Then, after the time t1, but before t2, the RST assumes a high voltage. Because the RST terminal 46 of timing unit 42 is connected to the EXTON terminal 36 of the PMU 32, the voltage on the EXTON terminal 36 also assumes a low voltage upon battery pack insertion, and then assumes a high voltage a time t1 later. The low to high voltage transition at the EXTON terminal 36 cause electrical signals to be sent by the PMU 32 to the processor 31 via at least one of the processor communication terminals 40. These electrical signals power up the processor 31.

The time t1 can be chosen to ensure that the operating specifications of the PMU 32 are met, as described above. The value of t1 can be modified by varying the capacitance of a capacitor 72 in the timing unit 42. In addition, in one embodiment that is USB compliant, the timing unit 42 is configured so that t2 is less than 100 ms. As described below, t2, like t1, is configurable.

The auxiliary power receiving unit 52 receives an auxiliary voltage from the auxiliary power supply 54 for providing power to the peripheral device. The auxiliary power receiving unit 52 sends an auxiliary power signal to the timing unit 42 in response to receiving the auxiliary voltage.

Subsequently, the timing unit 42 sends electrical signals to the input terminals 34 and 36 of the PMU 32 for powering up the processor 31 with the auxiliary power supply 54. These electrical signals are sent before a time t3 from the time when the auxiliary power supply 54 is connected to the peripheral device. The USB standard dictates that the processor power up within 100 ms of connecting the auxiliary power supply 54, during the enumeration period.

The forced reset unit 56 can reset the processor 31 by first powering down the peripheral device and then powering up the peripheral device, in response to receiving a forced reset signal from the processor 31. The forced reset signal saturates the gate of the transistor 88, thereby lowering the voltage on the RTC terminal 41 and powering down the peripheral device. The MR terminal 50 is asserted by the forced reset signal causing the peripheral device to power up.

The processor 31 asserts a voltage on a charge-on (CHRG_ON) terminal 104, which causes a voltage on a charge enable (CE_bqll) terminal 106 of the charger 62 to be asserted, thus maintaining the charger 62 active. When the voltage on the CHRG_ON terminal 104 is asserted, charge transfers immediately, via a diode 96 in the charger control unit 58, to the charger 62. If the voltage on the CHRG_ON terminal 104 is de-asserted, such as when a forced reset is invoked, charge accumulated in a capacitor 100 of the charger control unit 58 is still available to power the charger 62 for a time period that depends on the capacitance of the capacitor 100 and resistances of resistors 92 and 93 of the charger control unit 58. In one embodiment, the time period is on the order of about 100 ms.

If the voltage of a battery pack of a host device to which the peripheral device is connected drops below a threshold level, the host device issues a suspend command to the peripheral device. The suspend command asserts a voltage on a suspend terminal 108 of the processor 31, suspending activity in a time that meets the USB standard.

Having described the general structure and function of the device 30 for powering a peripheral device, the timing unit 42, the auxiliary power receiving unit 52, the forced reset unit 56 and the charger control unit 58 will now be further described.

Figure 4:
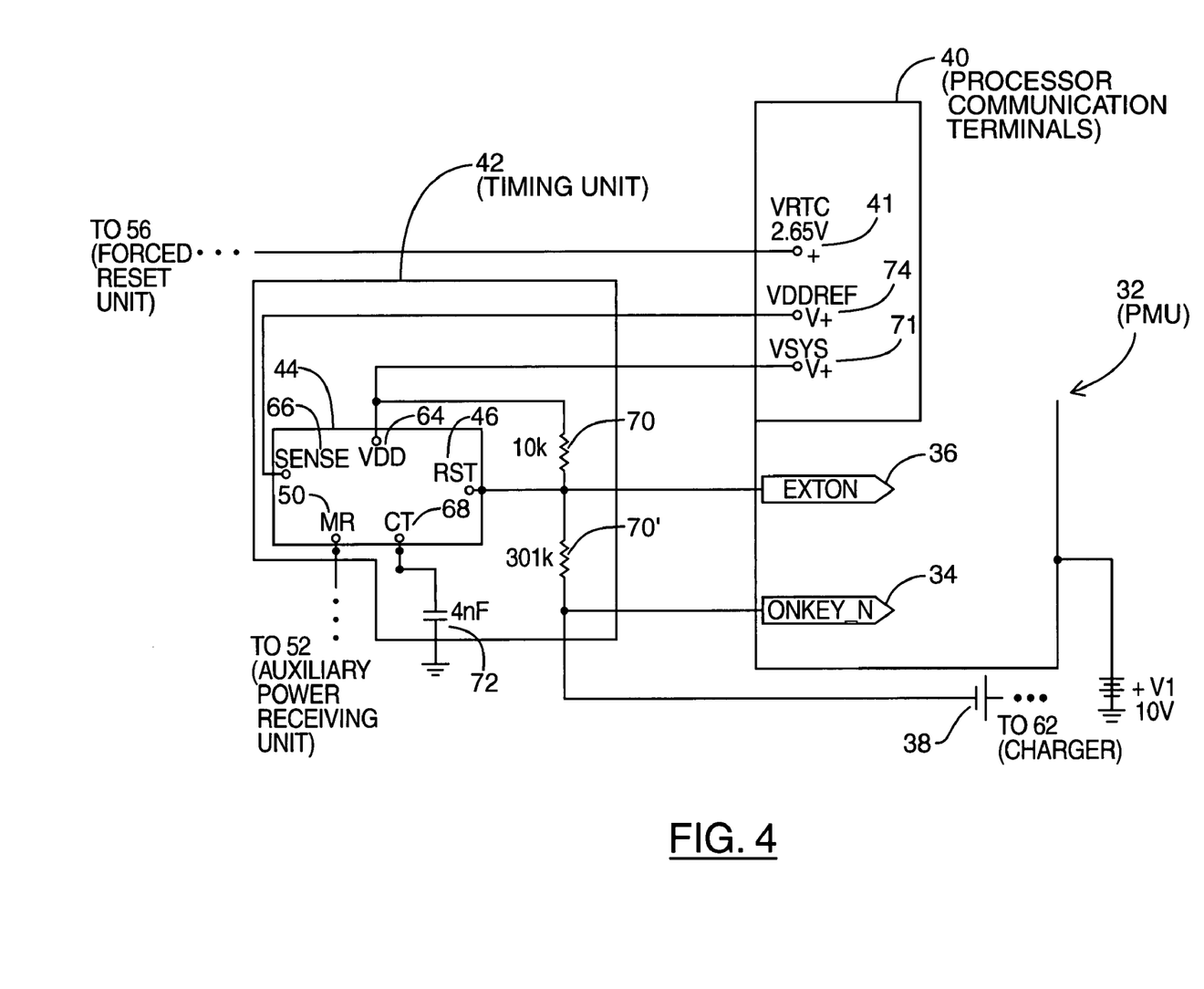
FIG. 4 is a circuit diagram of the timing unit of FIG. 2.

FIG. 4 shows a circuit diagram of the timing unit 42 electrically coupled to the PMU 32 and the battery pack 38. The timing unit 42 includes a monitoring component 44, such as the Texas Instrument™ TPS3808 component having a RST terminal 46, a MR terminal 50, a VDD terminal 64, a SENSE terminal 66, and a CT terminal 68. The timing unit 42 also includes two resistors 70 and 70', and a capacitor 72.

The monitoring component 44 monitor voltages, from about 0.4V to 5.0V, asserting an open drain signal at the RST terminal 46 when the voltage on the SENSE terminal 66 drops below a threshold value, or when the MR terminal 50 drops to a logic low. The RST terminal 66 output remains low for the configurable time t1 after the SENSE terminal 66 voltage and MR terminal return above their thresholds.

When the battery pack 38 is electrically connected to the peripheral device, the ONKEY input terminal 34 and the EXTON input terminal 36 assume a positive voltage V+, whose respective values depend on resistances of the resistors 70 and 70'. In addition, because the battery pack 38 is electrically coupled to the VDD terminal 64, the voltage of the RST terminal 46 output is asserted to low. When a battery pack 38 is present, VDD is normally equal to the voltage of the battery pack 78. The VDD terminal 64 is also coupled to a VSYS terminal 71, which is one of the processor communication terminals 40.

The voltage of the VDDREF terminal 74 on the PMU 32 is monitored by the monitoring component 44 at the SENSE terminal 66. Once the voltage on the VDDREF terminal 74 rises above a threshold voltage, a t1 delay time is initiated during which no signals are sent by the monitoring component 44 to the input terminal 34 and 36 of the PMU 32. The value of t1 is determined by the value of the capacitance of the capacitor 72. Thus, by changing the value of this capacitance, t1 can be correspondingly changed. After the delay time of t1, the voltage on the RST terminal 46 output is de-asserted to high voltage. The change in voltage of the RST terminal 46 from low to high asserts the EXTON terminal 36, which then causes a start up sequence in the PMU 32 leading to powering up of the processor 31.

Choosing t1 to be greater than 32 ms ensures that the low to high transition is registered by the PMU 32.

Another method for powering up the processor 31 from an inactive state ("sleep mode" or "shut down mode") is to connect an auxiliary power supply 54 to the peripheral device while the peripheral device is connected to a live battery pack 38. Connecting the auxiliary power supply 54 to the charger 62 (not shown in FIG. 4) supplies a voltage VUSB to a VUSB terminal of the charger 62. For example, when a USB-compliant host device is connected to the peripheral device via a cable, the cable supplies a VUSB voltage to the VUSB terminal 54 of the charger 62. The VUSB voltage actuates, via the auxiliary power receiving unit 52 (not shown in FIG. 4), the MR terminal 50 to a logic low, which in turn changes the voltage on the RST terminal 46 from high to low. Because the RST terminal 46 and the ONKEY terminal 34 are electrically coupled, the ONKEY terminal 34 also experiences a high to low voltage transition, which powers up the processor 31 within a time t3 from application of the VUSB. If t3 is less than 100 ms, than the connection with the host device powers up the processor 31 within 100 ms, in compliance with the USB standard.

Figure 5:
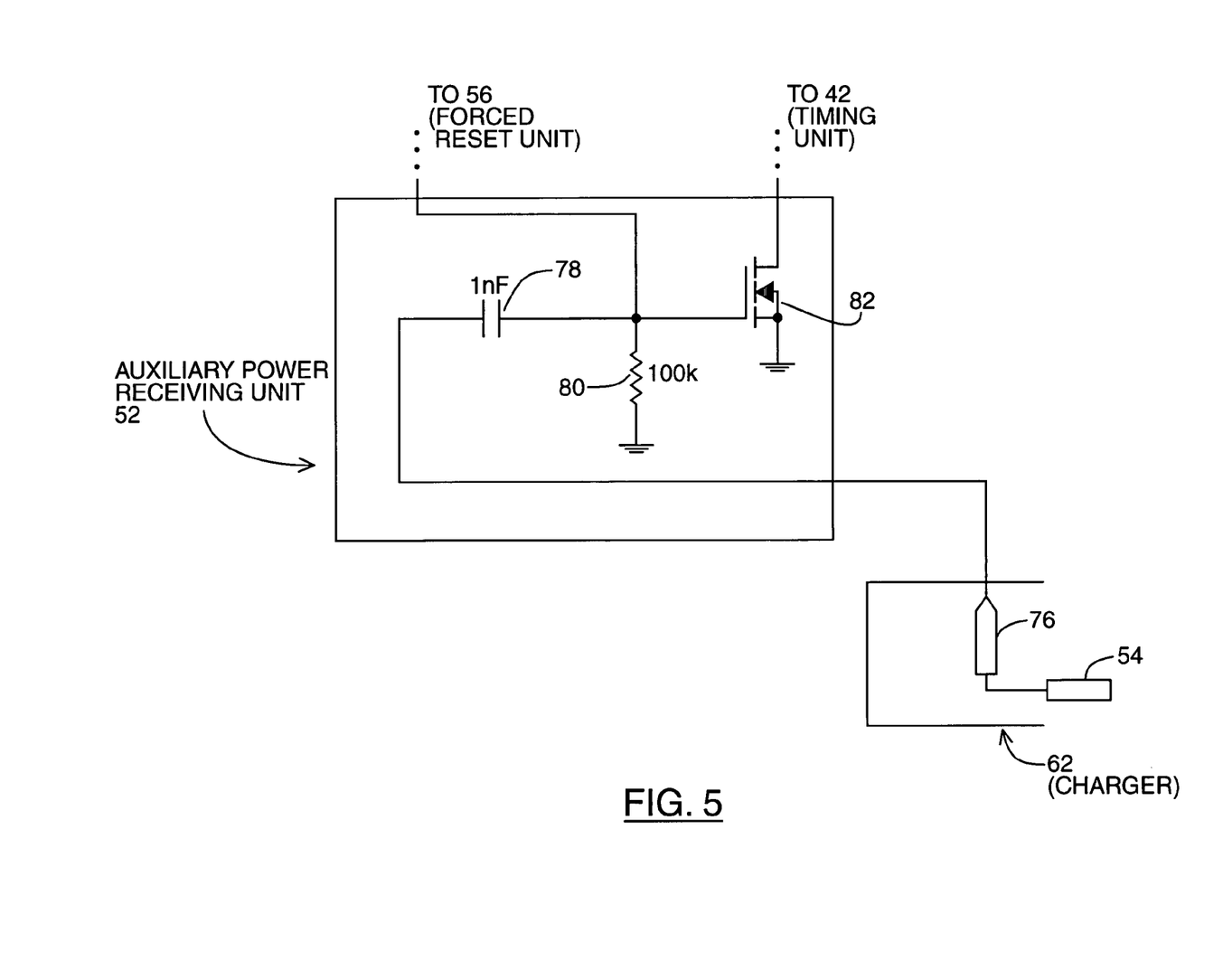
FIG. 5 is a circuit diagram of the auxiliary power receiving unit of FIG. 2.

Referring to FIG. 5, a circuit diagram of the auxiliary power receiving unit 52 coupled to the VUSB terminal 76 of the charger 62 is shown. The auxiliary power receiving unit 52 includes a capacitor 78, a resistor 80 and a transistor 82, such as a FET. When an auxiliary power supply 54 is connected to the VUSB terminal 76, a positive voltage is supplied to the terminal 76. The voltage transfers via the capacitor 78 to the transistor 82. The gate of the transistor 82 is thereby saturated, which causes a voltage to be asserted on the MR terminal 50 of the monitoring component 44 of the timing unit 42. As a result, the voltage on the RST terminal 46 is also asserted, causing the processor 31 to power up, as previously described.

Figure 6:
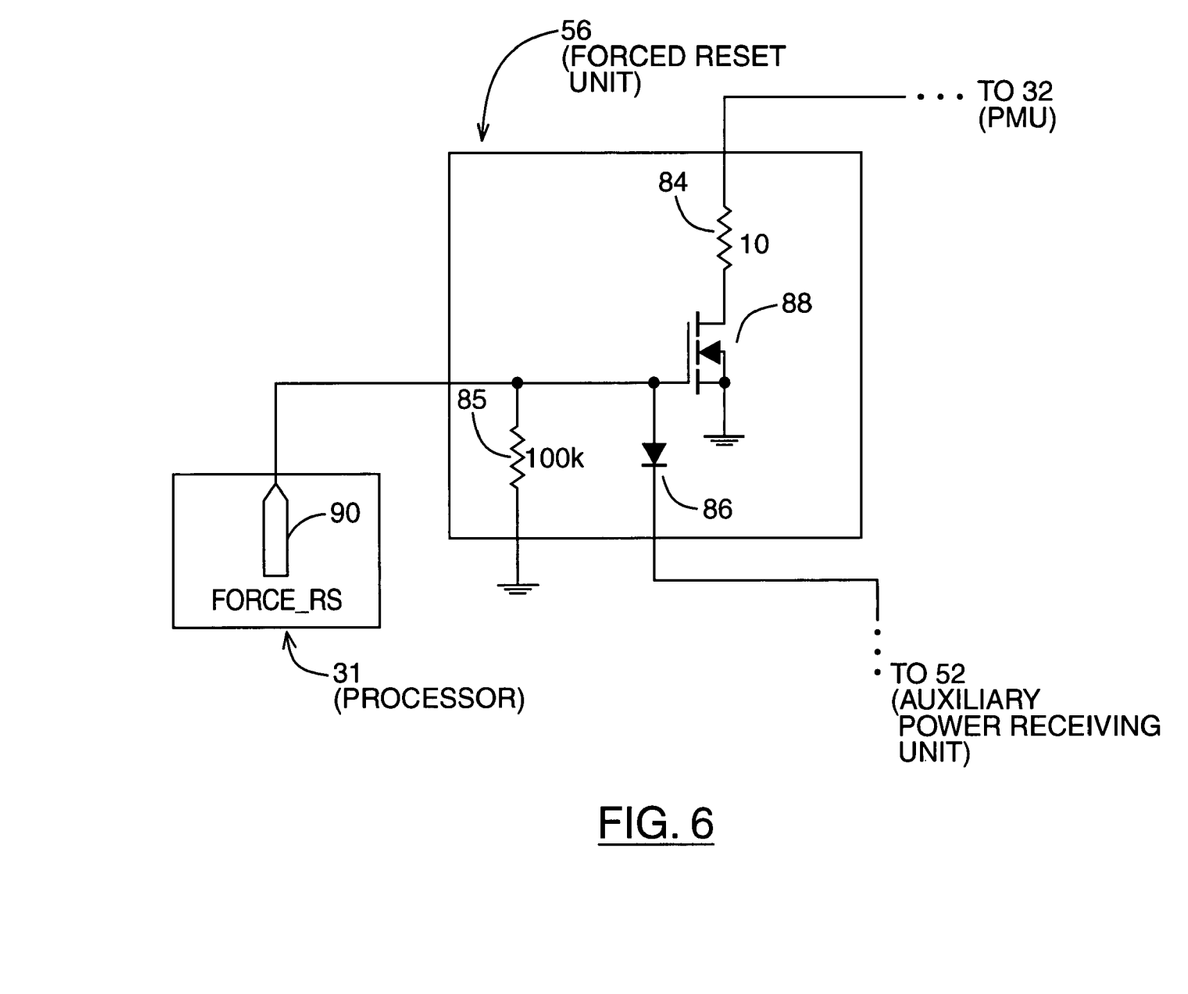
FIG. 6 is a circuit diagram of the forced reset unit of FIG. 2.

Referring to FIG. 5, a circuit diagram of the forced reset unit 56 coupled to the processor 31 is shown. The forced reset unit 56 includes resistors 84 and 85, a diode 86 and a transistor 88, such as a FET. The processor 31 has a forced reset (FORCE_RS) terminal 90 that is electrically connected to the forced reset unit 56.

The processor 31 can issue a forced reset command when a malfunction occurs, such as when communication between the PMU 32 and the processor 31 is severed. The forced reset command by the processor is actuated by asserting the FORCE_RS terminal 90 to high voltage, which saturates the gate of the transistor 88. Consequently, the RTC terminal 41 is shorted to ground voltage via the resistor 84. When the voltage on the RTC terminal 41 drops to a threshold level (such as 2.1V) on the way to ground, the PMU 32 powers down the processor 31. Concomitantly, the high voltage on the FORCE_RS terminal 90 lowers as current passes through the diode 86. Subsequently, the voltage on the MR terminal 50, which is electrically coupled to the diode 86 via the transistor 82, is asserted to a low voltage. The RST terminal 46 is then also asserted to low voltage, as are the input terminals ONKEY 34 and EXTON 36. After a time t1 from the time when the MR terminal returns above a threshold value, the input terminals ONKEY 34 and EXTON 36 assume a high voltage. Either the transition to low voltage or the transition to high voltage on the input terminals 34 and 36 powers up the processor 31. Thus, the processor is powered down and then powered back up by the preceding sequence of events. The forced reset unit 56 effectively equips the PMU 32 with a forced reset option, when in fact the PMU 32 alone does not possess such functionality.

Referring to FIG. 7, a circuit diagram of the charger control unit 58 of FIG. 2 is shown. The charger control unit 58 includes resistors 92-95, a diode 96, a transistor 98, such as a FET, and a capacitor 100. The charger 62 functions as a three-way switch, switching between the battery pack 38, the auxiliary power supply 54 and the AC power supply 102. Accordingly, the charger control unit 58 is coupled to the charger 62 and the processor 31. The charger 62 can be electrically connected to the battery pack 38, to the auxiliary power supply 54 and to an AC power supply 102. In one embodiment, the Texas Instrument™ bq24032 charge management IC charger can be used as the charger 62.

The charger control unit 58 ensures that the peripheral device meets the USB standard when a) a USB-compliant host device is connected to the peripheral device and the battery pack 38 is low or dead, b) a reset of the peripheral device occurs, or c) a suspend state is initiated. How the charger control unit 58 ensures USB compliance for these scenarios is now described in turn.

After connecting a USB-compliant host device, such as a laptop, to a peripheral device having no battery pack, or a low or dead battery pack, the charger 62 is actuated for a time on the order of 100 ms to allow the processor 31 to power up. Once the processor 31 powers up, a voltage is asserted at the charge-on (CHRG_ON) terminal 104 of the processor 31 and a charge enable (CE_bqll) terminal 106 of the charger 62, to which it is coupled via the charger control unit 58. As a result, the charger 62 is enabled. While the processor 31 is active, the processor 31 asserts a high voltage on the CHRG_ON terminal 104, thereby actuating the CE_bqll terminal 106 and maintaining the charger 62 active. This sequence of steps ensures that the processor 31 powers up within 100 ms of the connection to the host device, regardless of the condition of the battery pack 38. In particular, upon host device connection, the charger control unit 58 and charger 62 start and typically finish the sequence of steps that power up the processor 31 before the battery pack 38 is re-charged. Thus, the processor 31 powers up within 100 ms, while a low battery at about 2.2V may require about 30 s to be re-charged by the charger 62 to a 3V operating level.

The charger control unit 58 also permits the peripheral device to reset. In particular, without the charge control unit 58, deactivating the PMU 32 for resetting would cause the processor 31 and the charger 62 to power down. With the processor 31 and charger 62 powered down, the peripheral device would not be able to recover. The charger control unit 62 resolves this shortcoming to allow for resetting of the peripheral device.

Specifically, when the a voltage signal is asserted at the CHRG_ON terminal 104 by the processor 31, charge transfers immediately, via the diode 96 and the CE_bqll terminal 106, to the charger 62. If the voltage signal is not asserted at the CHRG_ON terminal 104, such as when a forced reset is invoked, charge accumulated in the capacitor 100 is still available to power the charger 62 for a time period related to the RC constant that is associated with the capacitor 100 and the resistors 92 and 93. The time period is on the order of about 100 ms, which is enough time for the peripheral device to reset, as described above with reference to the forced reset unit 56. During the forced reset, the CHRG_ON terminal is in its open state at low voltage.

The transistor 98 and resistors 94 and 95 are used to provide a suspend functionality to the peripheral device. Such functionality is useful when the peripheral device either has no battery pack 38, or the battery pack 38 is low in voltage or dead. In such case, the peripheral device can operate if it is connected to a USB-compliant host device, such as a laptop computer running on its own battery pack. If the voltage of the battery pack of the host device drops below a threshold level, a suspend command is issued to the peripheral device by the host device that asserts a voltage on a suspend terminal 108 in the processor 31. The suspend state must be reached within 10 ms of this command, according to the USB standard.

As described above, without the additional transistor 98 and resistors 94 and 95, the charger control unit 58 is able to supply power for about 100 ms to the charger after the voltage on the CHRG_ON terminal 104 is de-asserted, which time is ten times as long as the maximum time allowed by the USB standard for the suspend state to be reached. Thus, the transistor 98 and resistors 94 and 95 are included in the charger control unit 58 to suspend activity within 10 ms from the time when the voltage on the suspend terminal 108 is asserted to high.

Figure 8:
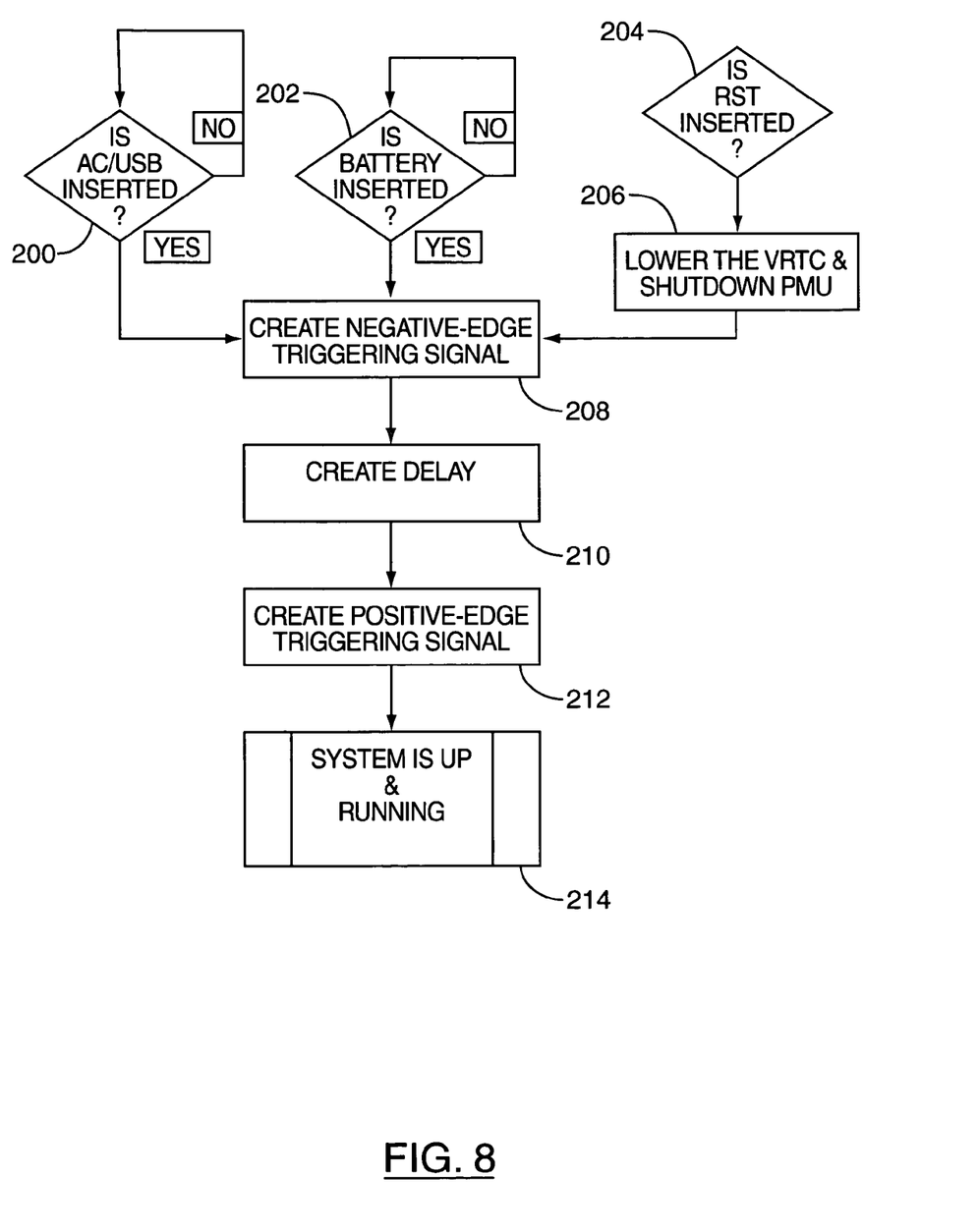
FIG. 8 is a flowchart illustrating steps undertaken by the device of FIG. 2 for powering up a processor.

FIG. 8 is a flowchart illustrating steps undertaken by the device 30 for powering up a processor. At step (200), the device 30 monitors whether an AC power supply 102 or a USB host device 54 is connected to the peripheral device. If an AC power supply 102 or a host device 54 is connected to the peripheral device, step (208) is executed. At step (202), the device 30 monitors whether a battery pack 38 is connected to the peripheral device. If a battery pack 38 is connected to the peripheral device, step (208) is executed. At step (204), the device 30 monitors the FORCE_RS terminal 90 to determine whether a forced reset command is issued by the processor 31. If such a command is issued, step (206) is executed and the voltage on the RTC terminal 41 is lowered and the PMU 32 is powered down. Then, step (208) is executed.

At step (208), a high to low voltage transition occurs at the input terminals 34 and 36 of the PMU 32. That is, a negative-edge triggering signal is generated. The PMU 32 causes a delay t1 to occur immediately thereafter at step (210). After this delay, at step (212), a low to high voltage transition occurs at the EXTON input terminal 36 of the PMU 32. That is, a positive-edge triggering signal is generated. In response, at step (214), the power-up sequence of the processor 31 is initiated.

After the power-up sequence initiates, which is signaled by the activation of the EXTON terminal 36, a further time t2−t1 is required for the sequence to complete, which time depends on the PMU 32. In particular, after the EXTON terminal 36 is asserted, a VCCH terminal (not shown in FIG. 2 or 3), which is a power rail that comprises one of the processor communication terminals 40 of the PMU 32, is asserted. For the Dialog™ DA9030 PMU, after approximately t2−t1=64 ms, a voltage on the output terminal RSTOUT_N (not shown in FIG. 2 or 3) is then asserted, which is followed by execution of code on the processor 31. Since t1 is about 32 ms, the time t2, which is the difference between the time at which the power-up sequence terminates, signaled by the assertion of RSTOUT_N or the execution of code by the processor 31, and the time at which the battery pack 38 is inserted, is about 96 ms. This time is just under 100 ms, a limit set by the USB standard. To reduce the time t2−t1 for the power-up sequence to complete, and hence reduce the time t2, a power-up time configuring unit can be added, which is now described.

Figure 9A:
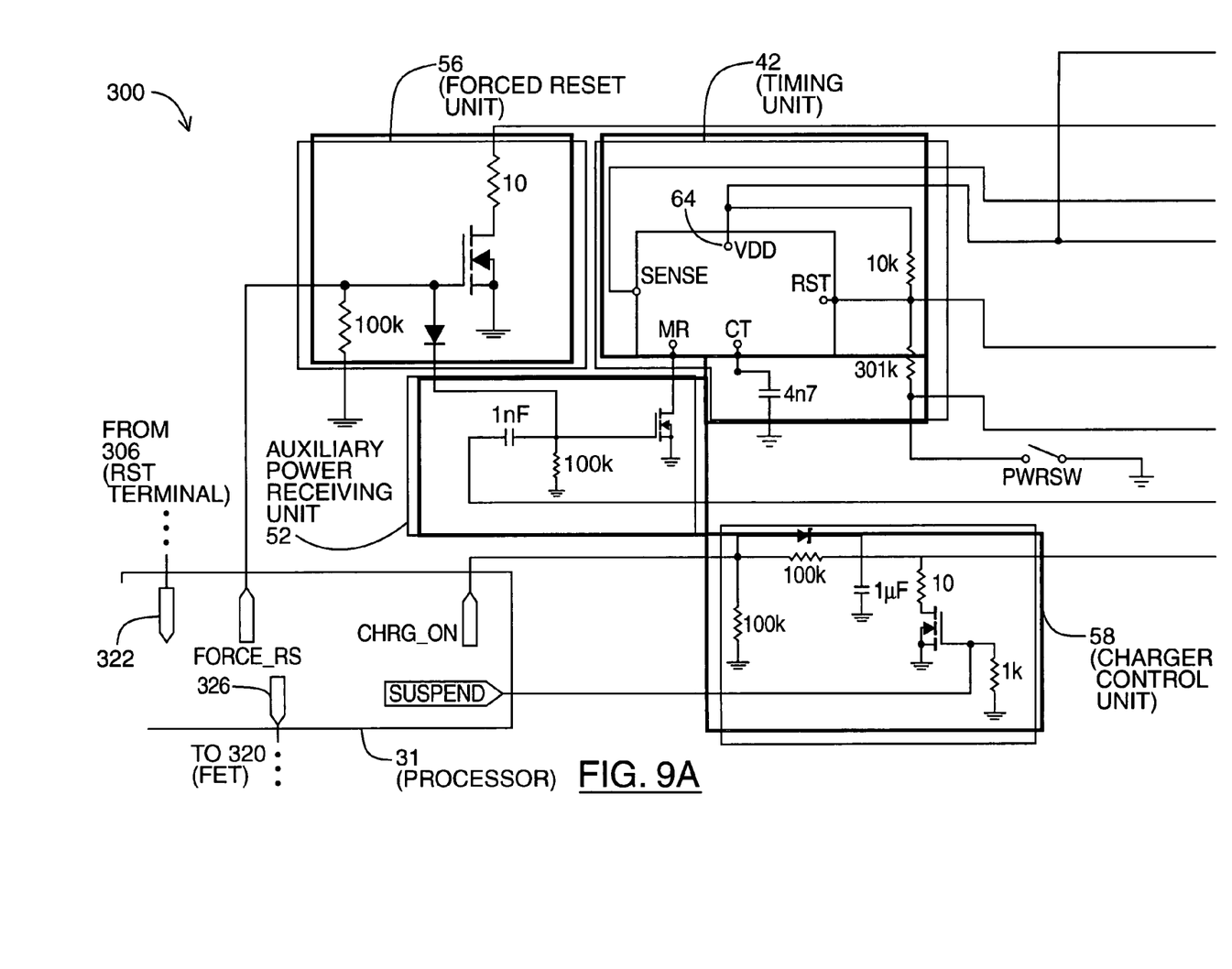
FIGS. 9A and 9B show a first part and a second part of a circuit diagram of a device for making a peripheral device compliant with a USB standard for power management, in accordance with the principles of the present invention.
Figure 9B:
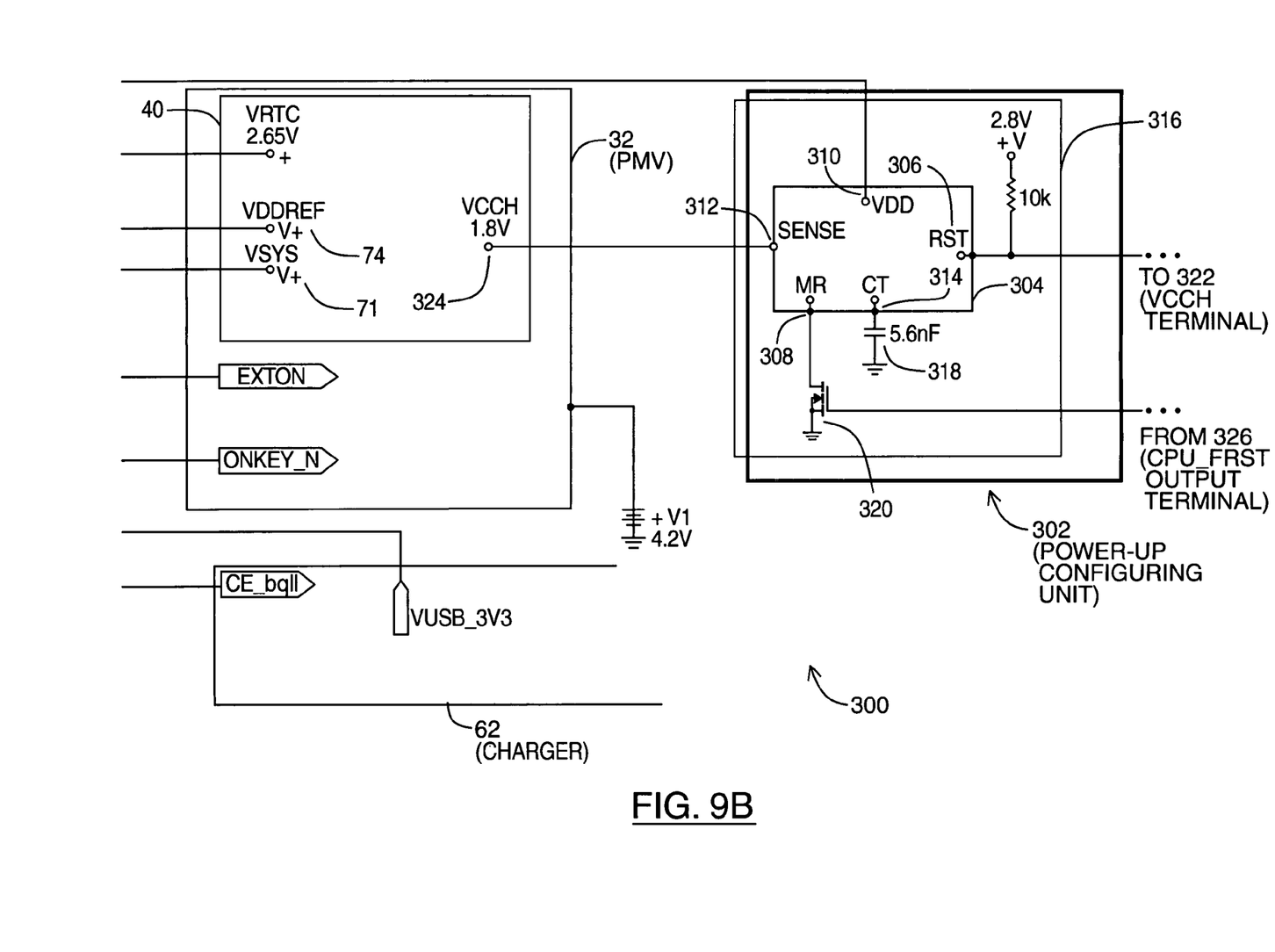

FIGS. 9A and 9B show a first part and a second part of a circuit diagram of a device 300 for making a peripheral device 20 (not shown in FIG. 9A or 9B) compliant with the USB power management standard. FIGS. 9A and 9B should be understood to be joined with FIG. 9A on the left and FIG. 9B on the right. The system 300 includes a power-up time configuring unit 302. Aside from the power-up configuring unit 302, the structure and function of the other units in the device 300 are similar to those shown in FIGS. 2-7 and described above, and will therefore not be discussed again in detail. The power-up time configuring unit 302 includes a second monitoring component 304, such as the Texas Instrument™ TPS3808 component, having a RST terminal 306, a MR terminal 308, a VDD terminal 310, a SENSE terminal 312, and a CT terminal 314. The power-up time configuring unit 302 also includes a resistor 316, a capacitor 318, and a FET 320.

The RST terminal 306 is connected to an input terminal CPU_RST 322 of the processor 31. The VDD terminal 310 is connected to a line connecting the VSYS terminal 71 to the VDD terminal 64 of the timing unit 42. The SENSE terminal 312 is connected to a VCCH terminal 324, or "power rail," which is one of the processor communication terminals 40. The FET 320 is connected to a CPU_FRST output terminal 326 of the processor 31.

The power-up time configuring unit 302 monitors the voltage on the VCCH terminal 322 at the SENSE terminal 312. When the voltage on the VCCH terminal 322 is asserted, in response to the EXTON terminal 36 being asserted, a shorter delay time t2−t1 is initiated. In particular, in response to the VCCH terminal 322 being asserted, the SENSE terminal 312 voltage rises until a threshold is reached, which can be 1.2V, for example, after which the shorter time delay t2−t1 is initiated. The value of this delay time can be set to various values by changing the capacitance of the capacitor 318. In one embodiment, t2−t1 is 32 ms. After this time, the RST terminal 306 is asserted and then the CPU_RST terminal 322 is asserted, which then activates the processor 31 to start executing code. Thus, the time from battery insertion until the end of the power-up sequence of the processor 31 drops from about 96 ms to 64 ms.

The processor 31 then monitors the RSTOUT_N terminal in the PMU 32 to determine when this terminal is asserted, which will be approximately 32 ms after the power-up sequence of the processor 31 is completed.

The power-up configuring unit 302 can also be used to force a reset on the processor 31. In particular, the CPU_FRST terminal 320 is employed to cause a forced reset of the processor 31 only, in contrast to the FORCE_RS terminal 90, which is used to force a reset of the PMU 32 and the processor 31. When the voltage on the CPU_FRST terminal 320 is asserted by the processor 31 to initiate a forced reset thereof, the MR terminal 308 is asserted to low, which in turn causes the voltage on the RST terminal 306 to drop to low. After a delay time of 32 ms, the RST terminal is asserted to high causing the processor 31 to start running.

It should be understood that various modifications could be made to the embodiments described and illustrated herein, without departing from the present invention, the scope of which is defined in the appended claims. For example, although emphasis has been placed on PDA's, other peripheral devices can benefit from the principles of the present invention.

What is claimed is:

1. An electronic device capable of deriving power from a host computing device when connected to said host computing device through a Universal Serial Bus (USB) connection, said electronic device comprising:
   a processor;
   a power supply connection for connecting the electronic device to a power supply comprising any of an insertable battery pack, an alternating current (AC) power supply and an auxiliary power supply comprising a host computing device;

a power management unit (PMU) coupled to the power supply connection and the processor for managing power allocated to the processor from the power supply; and a timing unit connected to the PMU and the power supply connection for sending electrical signals to the PMU for initiating power-up of the processor, the timing unit being adapted to send the electrical signals to input terminals of the PMU in response to any of the insertable battery pack, the AC power supply and the auxiliary power supply being connected to the electronic device;

wherein the timing unit is further adapted to send the electrical signals after a time t1 from a time when any of the insertable battery pack, the AC power supply and the auxiliary power supply is connected to the electronic device, the time t1 being selected to be compatible with an operating specification of the PMU as a time required for the PMU to register a voltage transition at the input terminals of the PMU but within a power-up time starting from the time when any of the insertable battery pack, the AC power supply and the auxiliary power supply is connected to the electronic device, where the power-up time is less than a 100 ms time period allowed for the processor to power-up during an enumeration period defined by the USB standard for the electronic device to identify itself to the host computing device and negotiate power distribution from the host computing device.

2. The device of claim 1, wherein the time t1 from the time when any of the insertable battery pack, the AC power supply and the auxiliary power supply is connected to the electronic device comprises a configurable time.

3. The device of claim 1, wherein the electronic device is any one of a personal digital assistant, a telephone, a digital camera, a modem, a keyboard, a mouse, a joystick, a memory drive, a tape drive, a floppy drive, a digital scanner, a printer, a data glove and a digitizer.

4. The device of claim 2, wherein the timing unit comprises a first capacitor for determining the configurable time t1.

5. The device of claim 1, wherein the PMU has an external-on (EXTON) terminal and at least one PMU component coupled to the EXTON terminal, wherein the at least one PMU component is coupled to a corresponding component in the processor, a voltage transition at the EXTON terminal causing the at least one PMU component and the corresponding component in the processor to start up, thereby activating the processor.

6. The device of claim 5, wherein the at least one PMU component comprises one or more of an internal reference, an internal oscillator, a voltage supervisor, a buck converter and a low dropout (LDO) regulator.

7. The device of claim 6, wherein the timing unit has a monitoring component with a reset (RST) terminal electrically coupled to the EXTON terminal for resetting the electronic device.

8. The device of claim 7, wherein if the RST terminal of the monitoring component has a low voltage after any of the insertable battery pack, the AC power supply and the auxiliary power supply is connected to the electronic device, then, after the time t1 from the time any of the insertable battery pack, the AC power supply and the auxiliary power supply is connected to the electronic device but within the power-up time, the RST terminal assumes a high voltage to initiate power-up of the processor.

9. The device of claim 1, further comprising a forced reset unit for resetting the processor by first powering down the electronic device and then powering up the electronic device in response to receiving a forced reset signal from the processor.

10. The device of claim 9, wherein the forced reset unit comprises a transistor for sending a forced reset signal to the timing unit for powering down the processor of the electronic device.

11. The device of claim 10, wherein the processor communication terminals comprise a real time clock (RTC) terminal coupled to the processor via the forced reset unit, such that the forced reset signal saturates the transistor, thereby lowering a voltage on the RTC terminal to thereby power down the processor of the electronic device.

12. The device of claim 11, wherein the timing unit comprises a monitoring component for monitoring voltages, the monitoring component having a master reset (MR) terminal, and a reset (RST) terminal, the MR terminal being asserted by the forced reset signal to thereby cause the processor of the electronic device to power up.

13. The device of claim 1, further comprising a charger control unit coupled to the processor, the charger control unit adapted for coupling to a charger for controlling power delivered to the processor from any of the battery pack, the AC power supply and the auxiliary power supply.

14. The device of claim 13 further comprising the charger, wherein the charger comprises a charge-on terminal that is adapted for receiving a voltage signal supplied by the processor that activates the charger.

15. The device of claim 14, wherein the charger control unit comprises a capacitor for holding enough charge for a first period of time after receiving the voltage signal from the processor, said charge capable of powering up the processor.

16. The device of claim 15, wherein, after the processor powers down and ceases to supply the voltage signal to the charge-on terminal, the charge held in the capacitor permits the processor to power up in a time less than the first period of time.

17. The device of claim 16, wherein the charger control unit comprises a transistor coupled to the processor for suspending activity of the electronic device when the processor issues a suspend command to the charger.

18. The device of claim 17, wherein the charger is adapted to inactivate in a second period of time from the time when the suspend command is issued that is less than the first period of time.

19. The device of claim 1, further comprising a power-up time configuring unit coupled to the processor and the power management unit for configuring the power-up time, the power-up time configuring unit having a replaceable capacitor having a capacitance that determines the power-up time.

20. A method for initiating powering up of a processor in an electronic device capable of deriving power from a host computing device when connected to said host computing device through a Universal Serial Bus (USB) connection, the electronic device comprising a power management unit (PMU) electrically coupled to the processor and comprising a timing unit coupled to the PMU and a power supply connection, wherein the PMU is configured for managing power allocated to the processor, the method comprising:

electrically connecting the power supply connection to a power supply comprising any of an insertable battery pack, an alternating current (AC) power supply and an auxiliary power supply comprising a host computing device to thereby connect the power supply to input terminals of the PMU via the timing unit; and sending electrical signals to the input terminals via the timing unit for initiating power-up of the processor of the electronic device in response to any of the insertable battery pack, the AC power supply and the auxiliary power supply being connected to the input terminals of the electronic device, the electrical signals being sent after a time t1 from the time when any of the insertable battery pack, the AC power supply and the auxiliary power supply is connected to the electronic device, the time t1 being selected to be compatible with an operating specification of the PMU as a time required for the PMU to register a voltage transition at power management function terminals of the PMU but within a power-up time starting from a time when any of the insertable battery pack, the AC power supply and the auxiliary power supply is connected to the electronic device, where the power-up time is less than a 100 ms time period allowed for the processor to power-up during an enumeration period defined by the USB standard for the electronic device to identify itself to a connected host device and negotiate power distribution from the host device.

21. The method of claim 20, further comprising providing the electronic device with a capacitor for configuring the time t1.

22. The method of claim 20, wherein the sending comprises applying a low to high voltage transition to one of the input terminals of the PMU to activate the processor.

23. The method of claim 20, further comprising resetting the processor with a forced reset unit by first powering down the electronic device and then powering up the electronic device in response to receiving a forced reset signal from the processor.

24. The method of claim 23, wherein the resetting comprises a transistor of the forced reset unit sending a power down signal for powering down the electronic device.

25. The method of claim 24, wherein the resetting comprises saturating the transistor with the forced reset signal; and, in response to the saturating, lowering a voltage of one of the processor communication terminals, thereby powering down the electronic device.

26. The method of claim 25, wherein the resetting comprises asserting a voltage at a master reset terminal of the timing unit in response to the forced reset signal to thereby cause the electronic device to power up.

* * * * *